Sept. 22, 1970     M. GARBUNY ET AL     3,530,401

LASER SCANNING SYSTEM

Filed Oct. 17, 1966                         3 Sheets-Sheet 1

WITNESSES:

INVENTORS
Max Garbuny &
Charles H. Jones.
BY
ATTORNEY

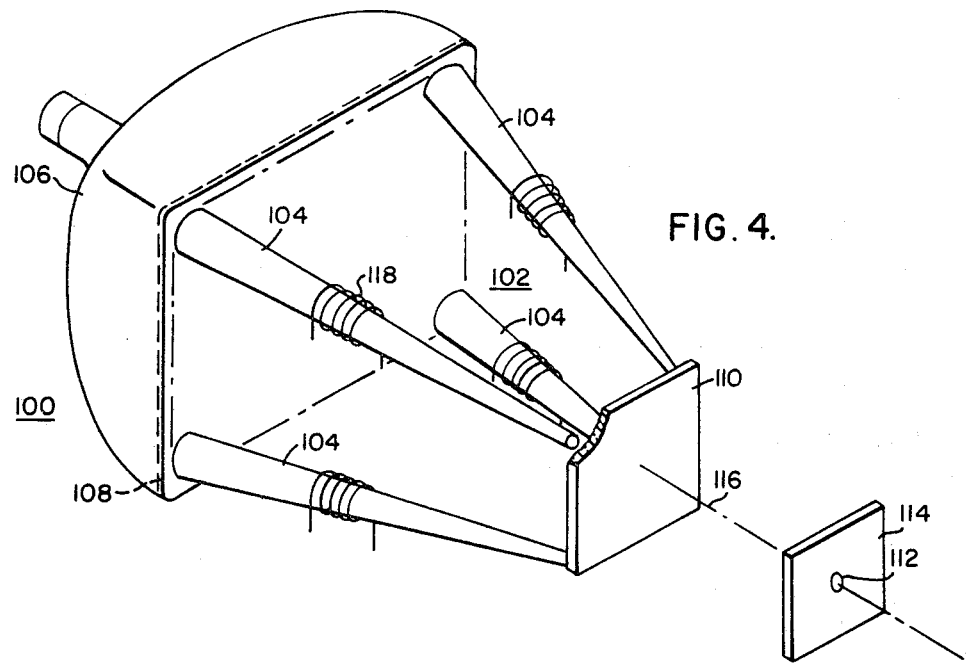
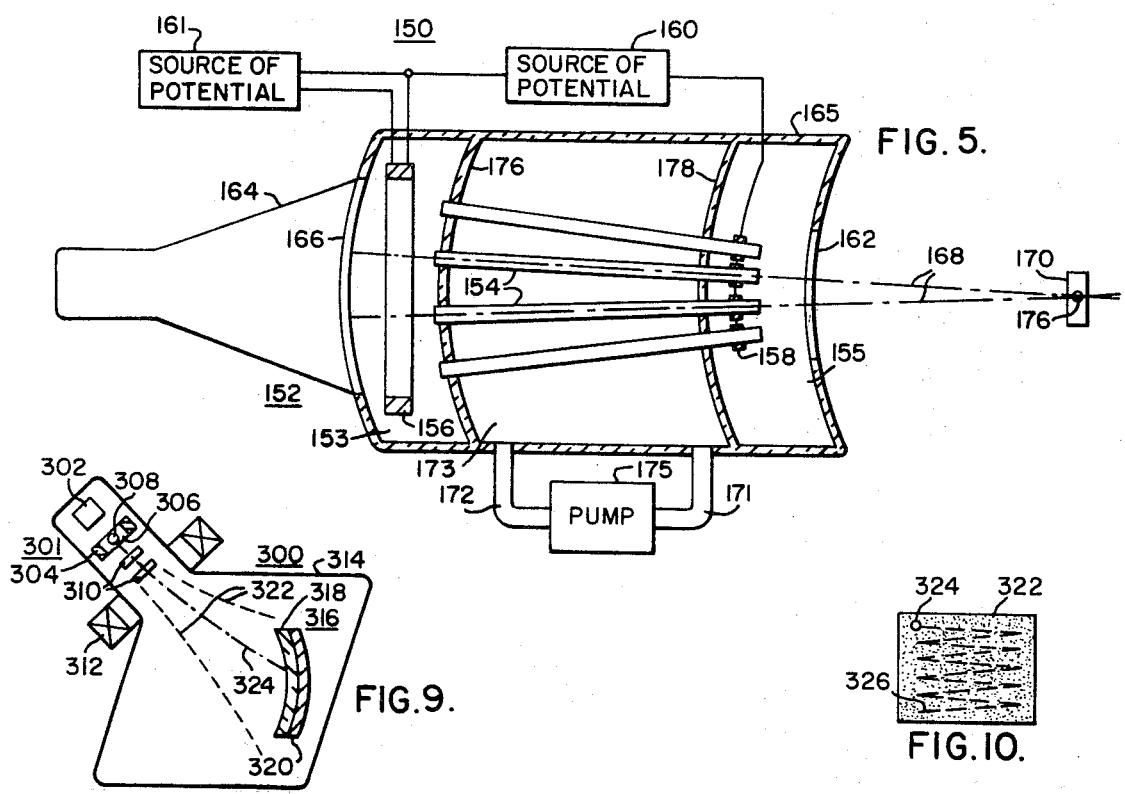

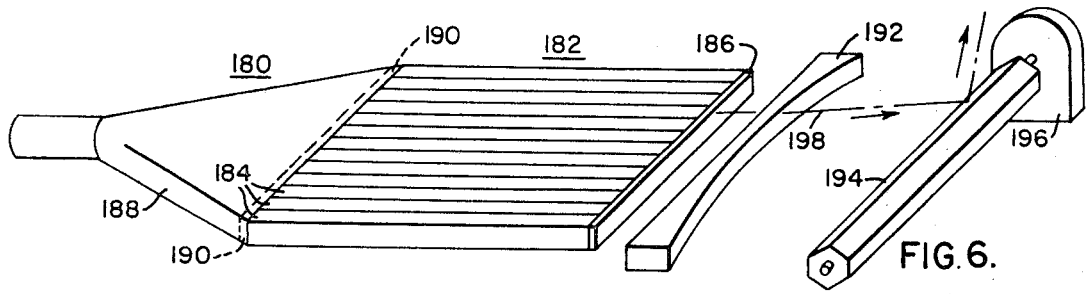
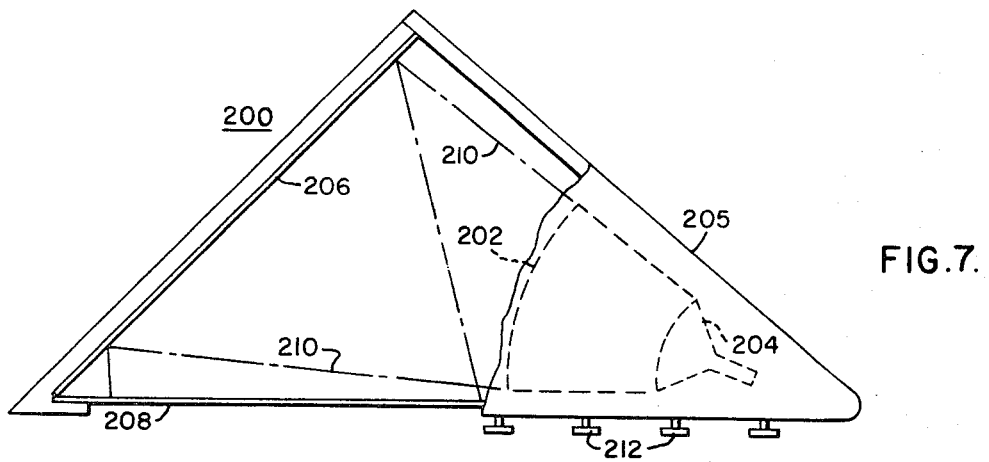
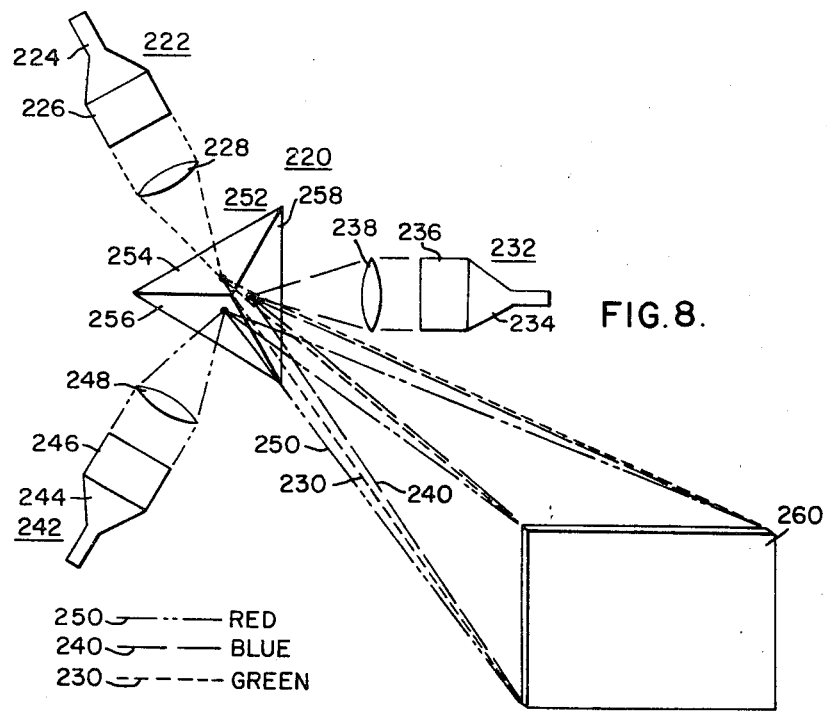

United States Patent Office 3,530,401
Patented Sept. 22, 1970

3,530,401
LASER SCANNING SYSTEM
Max Garbuny, Pittsburgh, and Charles H. Jones, Murrysville, Pa., assignors to Westinghouse Electric Corporation, Pittsburgh, Pa., a corporation of Pennsylvania
Filed Oct. 17, 1966, Ser. No. 587,042
Int. Cl. H01s 3/00
U.S. Cl. 331—94.5                              31 Claims This invention relates to systems for controlling radiation and more particularly to systems for selectively scanning a beam of coherent radiation as generated by a laser device or devices.

Recently, the invention of the laser has made possible the generation of coherent electromagnetic waves in the high frequencies of the visible and infrared spectrum. Coherent radiation in these frequency ranges is capable of carrying extremely large quantities of information. Furthermore, optical frequency radiation can be transmitted in a very narrow beam of radiation without the need for large complex antennae and with the consequent economy of radiated power, size and weight. In addition, lasers are capable of projecting beams of coherent radiation with high spatial definition. In order to realize the maximum potential of such lasers, it is desirable that apparatus be provided for controlling the amplitude and direction of these narrow pencil beams of coherent radiation.

More specifically, it would be desirable to provide suitable means for scanning a beam of coherent radiation in a set pattern or raster to thereby provide an image display of information or in another application to illuminate a field of view with coherent radiation to be sensed by suitable image detection means. In the prior art, scanning of laser beams has typically been accomplished by a mirror having a plurality of reflective surfaces which is driven by suitable motor means at the desired scanning rate. However, such mechanical systems, aside from their mechanical complexity, are limited as to the preciseness of the control of the beam of radiation and as to the rate of scanning of the optical beam. As a result, the rate at which information may be received from the field of view is likewise limited. Mechanical scanners incorporating the use of a rotating mirror or mirrors have an information retrieval rate of only $10^4$ to $10^5$ elements per second.

It is accordingly an object of the present invention to provide an improved and new system for controlling beams of coherent radiation.

It is a more specific object of the invention to provide a new and improved system for scanning coherent beams of radiation at rates in excess of those obtained by the prior art.

It is a further object of this invention to provide a new and improved system for scanning a beam of coherent radiation as provided by a laser without the use of mechanical scanners as employed by the prior art.

It is a further object of this invention to provide a new and improved system for electronically scanning a beam of coherent radiation as provided by a laser at rates in the order of $10^6$ to $10^7$ elements per second and with greater efficiency than obtained with the mechanical means of the prior art.

It is a further object of this invention to provide a new and improved system for electronically controlling the radiation from a large group of laser elements operating simultaneously to produce an image of greater intensity than obtained by the devices of the prior art.

These and other objects are accomplished in accordance with the teachings of the present invention by providing a new and improved system for controlling beams of coherent radiation including a laser for generating beams of coherent radiation, suitable reflective means such as a mirror disposed at one end of the laser, and reflective or absorption means disposed at the other end of the laser device for providing reflective surfaces to thereby initiate the generation of multiple beams of coherent radiation within the laser device. In one illustrative embodiment of this invention, the second reflective means takes the form of a semiconductive body whose reflection or absorption characteristic depends upon the number of free carrier electrons generated in response to selective forms of energy radiation directed thereon. More specifically, the semiconductive members will change their reflection or absorption characteristics in response to the bombardment of electron or photon beams. In one specific embodiment of this invention, the reflectivity of a semiconductive body may be successively changed in response to the bombardment of a scanning electron beam. It is noted that an incident electron or photon beam upon a semiconductor material will decrease the transparence in certain wavelengths to thereby increase the absorptance as well as the reflectance of the semiconductor material. Various embodiments of this invention will be described whose operation may depend upon a change of either the absorptance or the reflectance of the material.

Another aspect of this invention involves the use of means to converge the light generated by a laser device through a common point whereby the intensity of the beam of coherent radiation may be intensity modulated by suitable means such as a Kerr cell. In one specific embodiment, the first and second refractive means are so disposed with respect to each other that the laser mode struck therebetween generates a beam of coherent radiation which is directed through the common point. More specifically, this may be accomplished by forming the first and second reflection means to be of spherical configurations concentric with respect to each other. In a second specific embodiment of this invention, the laser device may be made up of a plurality of separate rods or elements whose axes converge through the common point.

In a further embodiment of this invention, a visual image may be displayed by scanning and intensity modulating a beam of coherent light onto a suitable screen. Further, a plurality of laser devices each generating a different monochromatic primary color may be projected onto a screen to thereby provide a visual image in full color.

These and other objects and advantages of the present invention will become more apparent when considered in view of the following detailed description and drawings, in which:

FIG. 4 shows an embodiment of this invention including a laser assembly including a plurality of laser elements whose axes each converge through a common point;

FIG. 5 shows a view of an embodiment of this invention similar to that shown in FIG. 4 employing a laser assembly with a plurality of laser elements;

FIG. 6 shows a view illustrating another embodiment employing a laser assembly with a single row of laser elements and a mechanical means for scanning the beams of coherent radiation generated by the laser assembly;

FIG. 7 shows a display system incorporatnig a system for scanning a laser beam across a display screen;

FIG. 8 shows a view of a display system for projecting a color image onto a display screen;

FIG. 9 shows a view of a flying spot scanner which may be substituted for the scanner in the system of FIG. 2; and FIG. 10 shows a cross-section of the electron beam generated within the scanner shown in FIG. 9.

Figure 1:
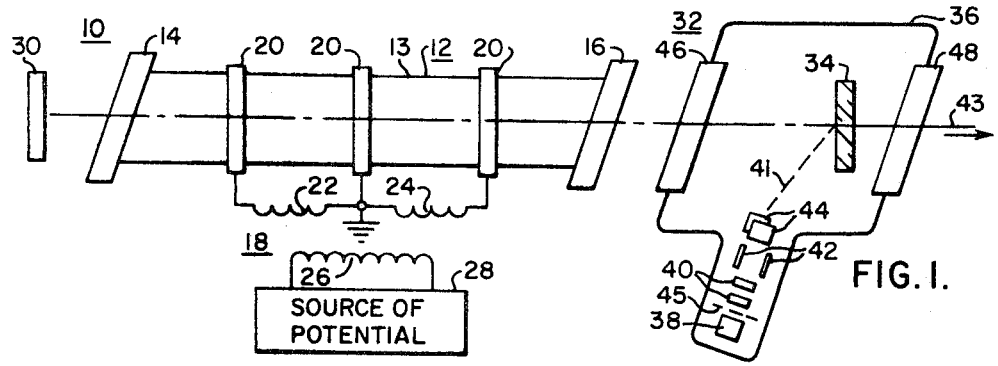
FIG. 1 is a view illustrating a first embodiment of a laser scanning system in accordance with this invention incorporating a semiconductive member whose reflectivity is varied in response to the bombardment of an electron beam.

Referring now to the drawings and in particular to FIG. 1, there is shown an illustrative embodiment of a radiation control system 10 including a laser device 12 and a pair of Brewster angle windows 14 and 16 disposed at either end thereof at suitable angles. The laser device 12 may be pumped by a plurality of annular electrodes 20 disposed about the laser device 12. In an illustrative embodiment of this invention, the laser device 12 may take the form of a cavity of a suitable insulating material such as glass or quartz and filled with a suitable gas such as argon or a mixture of helium and neon capable of generating a beam of coherent radiation composed of lines of several wavelengths. It is noted that a beam of a single wavelength will form to some extent circular diffraction patterns or rings around the central bright spot. Thus, if such a beam of radiation is used (as will be explained later) to form an image, this effect of a single wavelength beam may provide a series of bright and dark lines about the various objects of the image to thereby degrade the image. However, if the beam contains several discrete wavelengths, there results some cancellation of these interference fringes thereby providing a more defined image. The power for exciting the laser may be provided by a source 28 of RF excitation which may be applied to the electrodes 20 as through a transformer 18 including output windings 22 and 24 which are connected as shown in FIG. 1 to the electrodes 20, and an input winding 26 which is connected to the source 28. A suitable first reflection means such as a mirror 30 is disposed at the end of the laser device 12 opposite the Brewster angle window 14. The mirror 30 is substantially 100% reflective to thereby direct a beam 43 of coherent radiation as generated by the laser device 12 back through the device.

An electron scanning device 32 is disposed at the opposite end of the laser device 12 to intercept the beam 43 of coherent radiation. More specifically, the electron scanning device 32 includes an evacuated envelope 36 in which there is disposed an electron gun including a cathode element 38 for generating electrons, a control grid 45, focusing electrodes 40 for forming the electrons into a beam 41 which is deflected as by deflection electrodes 42 and 44 across the surfaces of a second reflecting means 34. In the alternative, a beam of light may be provided by focusing the light emitted from a suitable flying spot scanner such as a cathode ray tube onto the second reflecting means 34. Certain materials such as intrinsic semiconductors and insulators generate free carriers in the conduction band in response to bombardment of beams of radiant energy such as electrons or photons. In accordance with the theory of semiconductors, the increase of free carriers in the conduction band brings about a change of the complex index of refraction such that the reflectivity and absorption of these materials tend to become more metallic in character. In the particular embodiment shown in FIG. 1, the second reflecting means is made of a suitable insulating material or intrinsic semiconductor material such as indium antimonide which has the property of becoming more reflective in response to the bombardment of the electron beam 41. In the same manner, a reflectivity change occurs, if a scanning light spot is employed instead of the electron beam 41. The bombardment of the electron beam 41 causes the reflective means 34 to assume a more metallic optical characteristic within $10^{-7}$ seconds; further, the recombination time (i.e. the time in which the semiconductive material is restored to its original state) is in the order of $10^{-7}$ to $10^{-8}$ seconds. The electron scannng device 32 has a pair of Brewster angle windows 46 and 48 disposed upon either side of the second reflection means 34 through which the beam 43 of coherent radiation is directed.

In operation, the gas in the envelope of laser device 12 is pumped by the RF source 28 to cause inversion of the population in excited atomic states. As the excited atomic centers return to their ground state, they give off coherent radiation, if sufficient oscillator gain is provided by the reflection means. The beam 41 of electrons is scanned by suitable potentials applied to the deflection plates 42 and 44 across the surface of the second reflection means 34 in a regular pattern or raster to thereby cause discrete portions of the semiconductive body 32 to become reflective. As a particular portion of the means 34 becomes reflective, a laser mode is struck between that portion of the means 34 and the first reflective means 30 causing the laser to generate the beam 43 of coherent radiation. As the beam 43 is established between the first reflecting means 30 and the second reflecting means 34, a portion of the beam 43 is directed through the second reflecting means 34 which is not entirely reflective. Thus, the beam 43 of coherent radiation is scanned in a predetermined raster in response to the scanning of the electron beam 41. A video signal may be applied to the control grid 45 to intensity modulate the electron beam which will in turn intensity modulate the laser beam 43.

Figure 2:
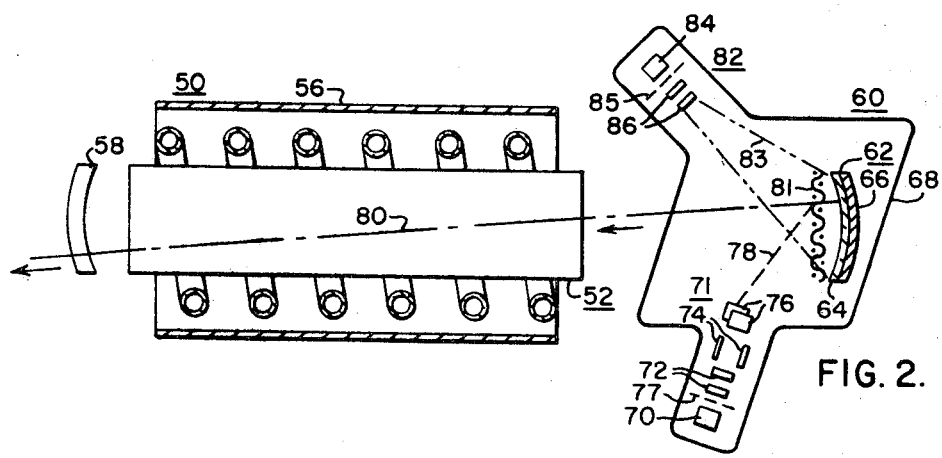
FIG. 2 is a view illustrating a further embodiment of this invention incorporating a semiconductive member whose absorption or transmission is varied in response to the bombardment of an electron beam to thereby expose a reflective surface disposed therebehind.

Referring now to FIG. 2, there is shown a radiation control system 50 which includes a laser device 52 of a suitable type such as ruby (i.e. $Al_2O_3$ doped with Cr ions), and which is pumped by suitable light source 54 such as a xenon lamp. A cylindrical reflector 56 is disposed about the light source 54 to direct the light emitted from the source 54 into the envelope of the laser device 52. A suitable first reflection means such as a mirror 58 having a reflectivity of approximately 98% is disposed at one end of the laser device 52. An electron discharge device 60 is disposed at the opposite end of the laser device 52. Illustratively, the electron discharge device 60 includes an evacuated envelope 68 in which there is disposed an electron gun assembly 71 including a cathode element 70 for generating electrons, a control grid 77, a pair of focusing electrodes 72 for forming the electrons into a beam 78 which is scanned by deflection plates 74 and 76 across a second deflection means 62. Illustratively, the second reflective means 62 includes a layer 64 of a suitable semiconductive material such as InSb or Si and a layer 66 having a reflectivity of substantially 100% and made of a suitable material such as aluminized quartz. Further, the second reflective means 62 and the mirror 58 are of spherical configurations with the centers of revolution of the mirror 58 and the reflective means 62 coinciding.

Further, there is shown in FIG. 2, a second electron gun 82 for uniformly directing a flood beam 83 of electrons over substantially the entire exposed area of the layer 64. Illustratively, the electron gun 82 includes a cathode element 84 for generating electrons, a control grid 85 and focusing electrodes 86. In addition, a screen or mesh 81 of a suitable electrically conductive material is disposed in a closely spaced relation to the second reflection means 62. Further, a layer of a suitable storage dielectric material such as aluminum oxide or glass is coated upon the mesh 81. Alternatively, a thin, free film of such a storage material may be supported in front of the means 62. In operation, the beam 78 of electrons is scanned across the mesh 81 thereby placing a pattern of charges upon the layer of storage material. The pattern of charges upon the mesh 81 will create a space charge thereby inhibiting corresponding portions of the flood beam 83 from reaching the layer 64. Those portions onto which the flood beam is directed are rendered opaque, whereas the portions corresponding to the incidence of the beam 78 are not bombarded by the electrons from the electron gun 82. Thus, these corresponding portions of the layer 64 remain transmissive thereby exposing a portion of the layer 66 of reflective material to the mirror 58. As a result, two opposing surfaces of the first and second reflecting means will cause a beam 80 of coherent radiation to be generated with a portion of the beam 80 being directed through the mirror 58. Finally, the beam 80 of coherent radiation will be generated and scanned in a discrete pattern or raster in accordance with the path that the electron beam 78 is scanned across the mesh 81.

The combined action of the electron guns 71 and 82 as shown in FIG. 2 is that of scanning a transparent spot on an opaque semiconducting filter thereby striking the laser beam 80. Referring now to FIG. 9, there is illustratively shown an electron discharge device 300 having a single electron gun 301 which may replace the electron device 60 in the system of FIG. 2. More specifically the electron gun 301 includes a cathode element 302 for generating electrons, a beam forming electrode 304 having an aperture 306, a spherically shaped electrode 308 for intercepting a portion of the electrons, and a pair of electrodes 310 for focusing a flood beam 322 of electrons into a target assembly 316. The assembly 316 includes a layer 320 of suitable reflective material and a layer 318 of semiconductor material which becomes opaque in response to the bombardment of electrons. Suitable deflection means such as a coil 312 scan the flood beam 322 across the surface of the layer 318. In operation, a portion of the electrons emitted by the cathode element 302 is intercepted by the spherical electrode 308 thereby casting a shadow designated in FIGS. 9 and 10 by the numeral 324. As the flood beam 322 is deflected in a pattern by the coils 312, the shadow 324 is in effect scanned as a function of time in a raster 326 across the surface of the layer 318. As a result, the layer 318 is rendered transmissive in that region where the shadow 324 falls at any moment of time and remains opaque in the remaining area. As explanied above, a laser mode will be struck between the portion of the reflective layer 320 exposed by the shadow 324 and a second reflective surface, and a beam of coherent radiation will be generated which follows the shadow 324 in its pattern 326.

Figure 3:
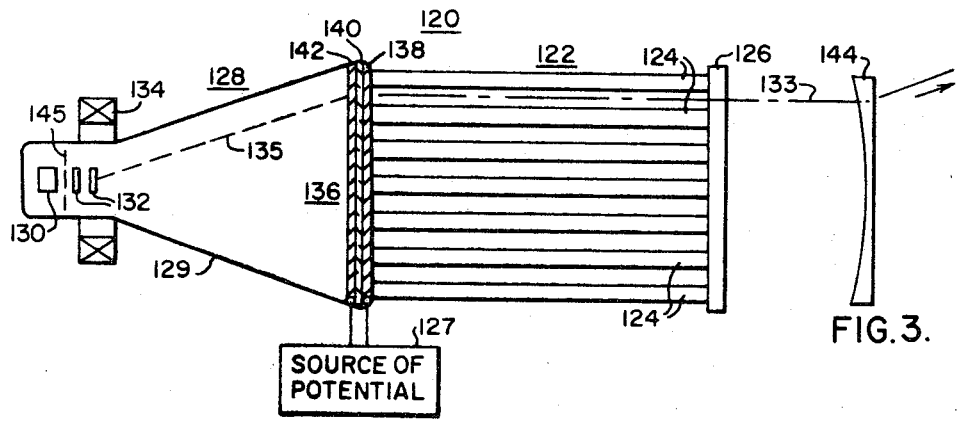
FIG. 3 shows a view of another embodiment of this invention incorporating a laser assembly including a plurality of laser elements.

There will now be described various embodiments of this invention in which the scanning mechanism is applied negatively. Referring to FIG. 3, there is shown a radiation control system 120 including a laser assembly 122 having a first reflector means such as a layer 126 of a suitable reflective material such as silver disposed upon one end thereof. An electron discharge device such as a dark-trace cathode ray tube 128 is disposed at the other end of the laser assembly 122. A significant aspect of this embodiment is that the laser assembly 122 is made of a plurality of laser elements or rods 124 which are disposed in a closely packed array forming the assembly 122. Illustratively, the laser elements 124 may be made of a suitable material such as ruby (i.e. $Al_2O_3$ doped with $Cr^{3+}$ ions), and may be excited with a suitable light source such as a xenon flash tube emitting radiation of approximately 0.56 micron wavelength. A second selectively reflective surface is provided by means including the cathode ray tube 128 having an evacuated envelope 129 in which there is disposed a cathode element 130 for generating electrons, a control grid 145, a pair of focusing electrodes 132 for forming the electrons into a beam 135 which is scanned by deflection coils 134 in a predetermined pattern or raster over a target assembly 136. The target assembly 136 may illustratively include a layer 140 of a suitable insulating material such as potassium chloride whose absorption characteristic is changed in response to a bombardment of the electron beam 135. This phenomenon may be explained upon the basis of the production of color centers in which the transfer of electrons from the negative chlorine ions of the potassium chloride fill the chlorine ion vacancies. The electrons in such vacancies are capable of excitation by visible light. Thus, a material such as potassium chloride tends to become opaque or non-reflective in response to the bombardment of electrons. For a further explanation and description of dark-trace cathode ray tubes, reference is made to Television, by V. K. Zworykin and G. A. Morton, second edition, pages 288 to 290. In addition, the target assembly 136 may include a layer 142 through which the electron beam 135 is directed to the layer 140. The layer 142 has the property of being electrically conductive, reflective of radiation, and transmissive to the beam 135 of electrons. Illustratively, the layer 142 may be made of a material such as aluminum of a thickness of approximately 1000 A. Further, a second layer 138 of electrically conductive material may be disposed upon the other side of the layer 142. The layer 138 is electrically conductive and is transmissive to the radiation as reflected from the layer 142. Illustratively, the layer 138 may be made of a suitable electrically conductive material such as tin oxide. In operation, the layer 140 which is made of a suitable alkalihalide crystalline material such as potassium chloride is darkened in response to the bombardment of high energy electrons. More specially, the beam 135 of electrons causes the formation of "color centers" because electrons are transferred from the negative chlorine ions of the potassium chloride lattice to the chlorine ion vacancies. As a result, the coherent light as generated by the laser elements 124 will not pass through the darkened portions of the layer 140. If the light as generated by the laser elements 124 will not pass through the darkened regions, the laser elements associated with the darkened regions will not lase. In regions where electrons are not directed upon the layer 140, the layer is rendered transmissive so that the laser elements 124 associated with these regions will generate beams 133 of coherent light which will be reflected back and forth between the first reflective means 126 and the layer 140 of reflective material. By intensity modulating the beam 135 of electrons as it is being scanned across the layer 140, an image resembling a photographic negative will be formed. Thus coherent radiation will be generated by the laser elements 124 associated with the transmissive regions of the layer 140 and may form a light pattern which may be focused by a convex lens 144 onto a display screen. The layer 140 will become transmissive if the beam 135 of electrons is turned off. However, erasure of the image upon the layer 140 can be accelerated by the application of a potential between the layers 138 and 142 as by the source 127. Though the operation of the embodiment of FIG. 3 has been described negatively in that the electron beam 135 renders the layer 140 dark, the polarity of the signal applied to the control grid 145 could be reversed to provide a positive display. On the other hand, the layer 142 could be made of an electrically conductive, transmissive material such as tin oxide, and the target assembly 136 could be operated in such a manner to modulate the reflectivity (as opposed to the absorptive properties) of the layer 140 for deriving an appropriate gain from the laser material.

Referring now to FIG. 4, there is shown a radiation control system 100 including a laser assembly 102 comprising a plurality of laser elements or rods 104 which are closely packed together to form an array. As shown in FIG. 4, each of the laser elements 104 is of a converging or conical configuration. Each of the laser elements 104 may be separately pumped as by excitation coil 118 which is disposed about the laser element 104. A suitable source of potential (not shown) may be connected to each of the coils 118. A first reflection means 110 of approximately 98% reflectivity may be disposed at the narrow end of the laser assembly 102, and a dark-trace cathode ray tube 106 as described above with respect to FIG. 3, is disposed at the enlarged end of the assembly 102. The dark-trace cathode ray tube 106 includes a second reflective means which takes the form of a layer 108 of suitable material such as potassium chloride which has the property of becoming opaque in response to the bombardment of electrons. It is an important aspect of this invention that the axis of each of the laser elements 104 pass through a common point 112. When a laser mode is struck between the first and second reflective means 108 and 110, each of the laser elements 104 will generate a beam 116 of coherent radiation that will pass through the point 112. As a result, the intensity of the beam 116 of coherent radiation may be modulated at the point 112 by means 114 for intensity modulating. Illustratively, the intensity modulator 114 may take the form of a Glan-Thompson prism and a nitrobenzene Kerr cell, or a KDP crystal. It is noted that the cathode ray tube 106 could be operated in a negative mode wherein substantial portions of the surface 108 are rendered dark. In the alternative, the polarity of the signal applied to the control grid of the cathode ray tube 106 could be reversed to derive a positive display. Further, the cathode ray tube could be operated to modulate either the absorption or the reflectivity properties of the layer 108.

Referring now to FIG. 5, there is shown a radiation control system 150 including a laser assembly 152 comprising a plurality of tubular elements 154 closely packed in an array so that the axis of each of the tubular elements 154 passes through a common point 176. The tubular elements are supported within an enclosure 165 including a first chamber 153 disposed at one end thereof, a second chamber 155 disposed at the other end, and an intermediate chamber 173. Further, one end of each of the tubular elements extends through openings within a wall 176 that separates the chambers 153 and 173, whereas the other end of the tubular elements 154 extend through openings in a wall 178 that separates the chamber 173 and 155. The tubular element 154 may be of an insulating material such as quartz and have ends which open respectively into the chambers 153 and 155. The tubular elements 154 and the chambers 153 and 155 are filled with a suitable gas capable of supporting a laser action such as argon and maintained at a suitable pressure of approximately 0.2 torr. Further, the gas within the tubular elements may be excited by a source 160 of D.C. voltage which supplies several hundred volts between an annular electrode 156 and a plurality of electrodes 158. The electrode 156 is disposed within the chamber 153 about the ends of the tubular elements 154 and heated by a suitable source 161 of D.C. voltage. The electrodes 158 may be individually disposed about the ends of each of the tubular elements 154 and electrically interconnected with each other. Further, the chamber 173 may be filled with a suitable coolant such as water which is circulated through the conduits 171 and 172 by a pump 175.

A dark trace cathode ray tube 164 as described above with respect to FIG. 3 is disposed at one end of the tabular elements 154 so as to expose selected, reflective portions of a target assembly 166 to the tubular elements 154. The lasing action of each element 154 takes place between the reflective portions of the assembly 166 and a reflective surface 162 such as a dichroic mirror which is selectively reflective to the wavelength(s) of the radiation to be generated. A laser mode is struck in a tubular element 154 in response to the variations of the reflectivity of that portion of the assembly 166 which lies on the axis of the tubular element 154. The beams 168 of coherent radiation generated within the elements 154 are directed through the common point 176 by making the reflective surfaces of the assembly 166 and the mirror 162 concentric with respect to the point 176. A suitable mechanism or shutter 170 may be disposed at the point to control or modulate the intensity of the total radiation 176 emitted from this device.

Referring now to FIG. 6, a radiation control system 180 is shown including a laser assembly 182 comprising a plurality of laser elements 184 disposed in a single row. Upon one end of the laser assembly 182, there is disposed a first reflection means taking the form of a mirror 186.

A dark-trace cathode ray tube 188 similar to that described above with regard to FIG. 3 is disposed upon the other end of the laser assembly 182. The dark-trace cathode ray tube 188 includes a second reflection means taking the form of a layer 190 of a suitable material such as potassium chloride which has the property of becoming reflective in response to the bombardment of an electron beam. In operation, a portion of the layer 190 will become reflective as the beam of electrons is scanned thereon and a laser mode will be struck between this portion of the layer 190 and the mirror 186 to thereby generate a beam 198 of coherent radiation in one or several of the laser elements 184. The beam 198 of coherent radiation is directed along a diverging path by a lens 192. In order to provide for the deflection of the beam 198 along a dimension other than that of the row of laser elements 184, there is provided a reflecting member 194 having a plurality of reflecting surfaces and a motor 196 which is mechanically coupled to rotate the reflecting member 194. Thus, as reflecting surfaces of the member are rotated, the beam 198 of coherent radiation may be reflected in a direction perpendicular to the plane of the laser assembly 182. One of the advantages of the embodiment shown in FIG. 6 is that all of the laser elements 184 may be pumped as by a single suitable source of excitation such as a xenon light from the top and bottom so that all the elements are substantially equally excited. Further, it is noted that though a rotating reflective surface is not capable of obtaining the scanning rates obtainable by the electronic means suggested herein, it is not normally necessary to provide deflection in the plane perpendicular to the assembly 182 at rates approaching that which may be accomplished in the plane or row of laser elements 184.

Referring now to FIG. 7, there is shown an image display system 200 including a laser assembly 202, and a dark-trace cathode ray tube 204 as described above with regard to FIG. 3 for striking a lasing pattern within the assembly 202 to thereby provide an image 210 of coherent radiation. The coherent radiation image 210 is reflected as by a suitable mirror 206 onto a display screen 208 which may illustratively take the form of a ground glass plate. Illustratively, the laser assembly 202 and the cathode ray tube 204 may be mounted as in an enclosure 205 and suitable controls 212 may be disposed on the front of the enclosure 205. Thus, the laser system in accordance with the teachings of the invention may be used to display a visual image in a manner similar to a television receiver upon the display screen 208.

Referring now to FIG. 8, there is shown a color display system 220 including a plurality of image laser systems for directing an image of each of the primary colors onto a display screen 260. More specifically, there is provided a green color source 222 including; a dark-trace cathode ray tube 224, a laser assembly 226, and a convex lens 228 for focusing the image of coherent radiation generated therefrom. Illustratively, the laser assembly 226 may be made of a material such as argon for providing a green image 230 having a wavelength of approximately 0.51 microns. Further, there is provided a blue color source 232 including a dark-trace cathode ray tube 234 and a laser assembly 236 for generating a blue image 240 which is focused by a lens 238. Illustratively, the laser assembly 226 may be made of a material such as benzo-phenone-naphthalene for providing a blue image 240 having a wavelength of aproximately 0.47 micron. In addition, there is provided a red color source 242 which illustratively includes a dark-trace cathode ray tube 244, a laser assembly 246 using a suitable material such as pink ruby with chromium for generating a red image 250 with a wavelength of approximately 0.69 micron which is focused by a lens 248. It is noted that argon emits coherent radiation of several wavelengths from blue-yellow to blue. Hence, the laser assemblies 226, 236 and 246 could contain argon, but would require appropriate filters to select the proper color. Each of the component images 230, 240 and 250 are directed as by a reflecting member 252 onto the image screen 260. More specifically, the member 252 has a plurality of reflecting surfaces 254, 256 and 258 which respectively direct the images 230, 250 and 240 onto the screen 260. As seen in FIG. 8, the component images 230, 240 and 250 are in effect superimposed upon the screen 260 to display an image which is made up of three primary colors. In this manner essentially all the colors visible to the human eye can be reproduced.

Since numerous changes may be made in the above described apparatus and different embodiments of the invention may be made without departing from the spirit thereof, it is intended that all matter contained in the foregoing description and as shown in the accompanying drawings shall be interrupted as illustrative and not in a limiting sense.

We claim as our invention:

1. A radiation control system including first means capable of being excited to an inverted population between at least two different energy states and capable of radiating energy of a frequency related to the difference in energy between said energy states, second means for applying pumping excitation to said first means to establish said inverted population, third means for selectively establishing first reflective portions in response to impinging energy, and fourth means for presenting second reflective portions to effect in cooperation with said first portions coupling of the radiant energy of said first means to establish beams of coherent radiation as determined by the position of said first reflective portions.

2. A radiation control system as claimed in claim 1, wherein said third means has the property that the optical characteristics may be varied in response to beams of energy, and fifth means for directing said beam over various portions of said third means.

3. A radiation control system as claimed in claim 1, wherein said third means has the property that the optical characteristics may be varied in response to a patterned flow of energy, and fifth means for directing said flow over various portions of said third means.

4. A radiation control system as claimed in claim 1, wherein said third means is made of a material having the property of increasing the number of free carriers in the conduction band in response to beams capable of transmitting discrete quantities of energy, and fifth means for directing said beam over various portions of said third means.

5. A radiation control system as claimed in claim 1, wherein said third means is made of a material having the property of generating an increased number of electrons within the conduction band in response to the bombardment of electrons, and fifth means for generating a beam of electrons and for directing said beam of electrons onto various portions of said third means to thereby affect the reflectivity of said portions.

6. A radiation control system as claimed in claim 5, wherein said material is an intrinsic semiconductor.

7. A radiation control system as claimed in claim 1, wherein said third means is made of material having the property of becoming non-reflective in response to the bombardment of electrons, and fifth means for generating a beam of electrons and directing said beam of electrons over various portions of said third means to thereby render said portions non-reflective.

8. A radiation control system as claimed in claim 1, wherein said third means includes a first layer of a material having the property of becoming transmissive in response to the bombardment of electrons and a second reflective layer, and fifth means for generating a beam of electrons and directing said beam of electrons onto said first layer to thereby expose a portion of said second reflective layer.

9. A radiation control system as claimed in claim 1, wherein said third and fourth means are of such a configuration and are so disposed with respect to each other that a common line intercepting said third and fourth means is perpendicular to said third and fourth means.

10. A radiation control system as claimed in claim 9, wherein said third and fourth means are of pherical configurations with a common center of curvature.

11. A radiation control system as claimed in claim 1, wherein said first means includes a plurality of laser elements disposed in an array.

12. A radiation control system as claimed in claim 11, wherein said second means has the property of independently exciting each of said laser elements.

13. A radiation control system as claimed in claim 11, wherein said second means includes a plurality of windings of an electrical conductor disposed about each of said laser elements.

14. A radiation control system as claimed in claim 11, wherein said laser elements are so disposed that the axis of each of said laser elements passes through a common point.

15. A radiation control system as claimed in claim 1, wherein said third means includes a layer of potassium chloride, and means for generating a beam of electrons and for directing said beam of electrons across said layer to thereby render portions of said layer reflective.

16. A radiation control system as claimed in claim 15, wherein there is included fifth means disposed at said common point for modulating the intensity of the beams of coherent radiation as provided by said laser elements.

17. A radiation control system as claimed in claim 15, wherein said elements are of conical configuration.

18. A radiation control system as claimed in claim 11, wherein said laser elements are disposed in a single row along a first dimension, fifth means including a plurality of reflective surfaces, and sixth means for moving said reflective surfaces to direct the beams of coherent radiation along a second dimension different from said first dimension.

19. An image display system including the radiation control system of claim 1, wherein there is included a screen for displaying an image in response to said beam of coherent radiation as directed thereon by said radiation control system.

20. An image display system including at least two radiation control systems as claimed in claim 1, wherein said first radiation control system has the property of projecting a beam of radiation of a first wavelength, said second radiation control system has the property of projecting a beam of coherent radiation of a second wavelength, a screen for displaying said beams of coherent radiation, and fifth means for superimposing said first and second beams of coherent radiation onto said display screen.

21. A radiation control system as claimed in claim 1, wherein said first means provides a beam of coherent radiation of more than one wavelength.

22. A radiation control system as claimed in claim 1, wherein said third means includes a member having the property of being rendered opaque in response to a beam of radiant energy, and fifth means for scanning said beam of radiation across said member.

23. A radiation control system as claimed in claim 22, wherein said member is responsive to a beam of electrons, said fifth means directs said beam of electrons onto said member.

24. A radiation control system as claimed in claim 23, wherein said fifth means includes an electrode for controlling the intensity of said beam of electrons.

25. A radiation control system as claimed in claim 23, wherein said fifth means directs a flood beam of electrons onto said member and further includes sixth means for preventing a part of said flood beam from being directed onto selected portions of said member.

26. A radiation control system as claimed in claim 25, wherein said sixth means includes an electrode disposed to intercept a portion of said flood beam of electrons and seventh means for deflecting said flood beam of electrons across said member.

27. A radiation control system as claimed in claim 25, wherein said sixth means includes a target member capable of storing a charge pattern thereon in response to electron bombardment, and seventh means for directing a beam of electrons onto said target member, said target member disposed so that said charge pattern established upon said target member effectively modulates said flood beam of electrons.

28. A radiation control system as claimed in claim 1, wherein said first and second portions are so disposed to direct said beams of coherent radiation through a common point.

29. A radiation control system as claimed in claim 28, wherein there is included fifth means disposed at said common point for modulating the intensity of said beams of coherent radiation.

30. A radiation control system as claimed in claim 1, wherein said third means includes a member made of an alkali halide, and means for directing a beam of radiant energy upon said member for modulating the reflectivity of said member.

31. A radiation control system as claimed in claim 1, wherein said third means includes a member having the property of being rendered transparent in response to a beam of radiant energy, and fifth means for directing a beam of radiant energy onto selected portions of said member.

References Cited
UNITED STATES PATENTS

| | | | |
|---|---|---|---|
| 3,237,011 | 2/1966 | Sterzer | 331—94.5 |
| 3,289,101 | 11/1966 | Masters et al. | 331—94.5 |

OTHER REFERENCES

IBM Tech. Disc. Bul., Myers, vol. 8, No. 12, May 1966, p. 1790.

JOHN KUMINSKI, Primary Examiner